March 14, 1933. H. H. WATERS ET AL 1,901,618
INTERNAL COMBUSTION ENGINE
Filed Jan. 22, 1930
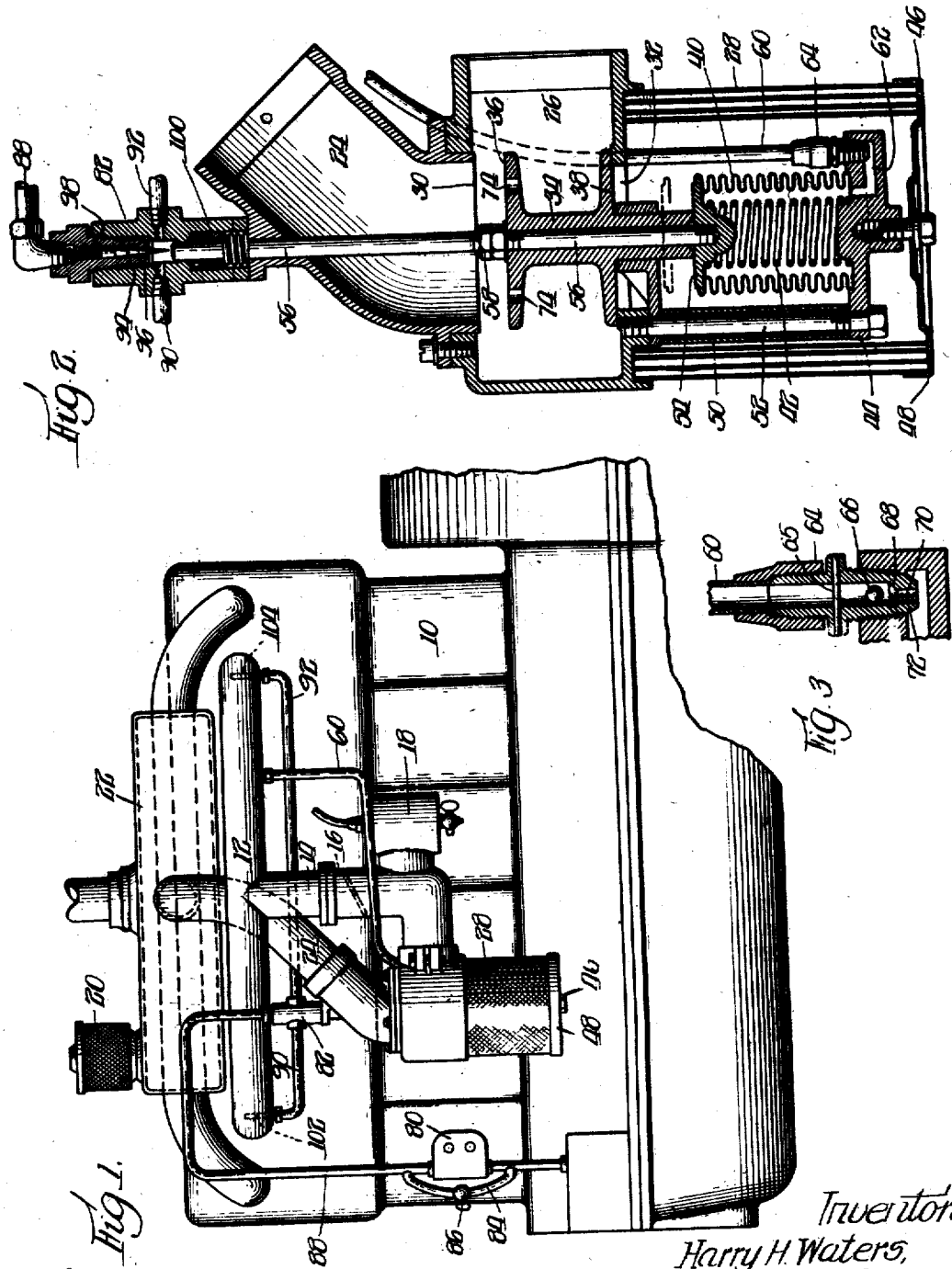
Inventors:
Harry H. Waters,
Rudolph F. Gagg, Patented Mar. 14, 1933

1,901,618

UNITED STATES PATENT OFFICE

HARRY H. WATERS AND RUDOLPH F. GAGG, OF CLINTON, IOWA, ASSIGNORS TO CLIMAX ENGINEERING COMPANY, OF CHICAGO, ILLINOIS, A CORPORATION OF DELAWARE

INTERNAL COMBUSTION ENGINE

Application filed January 22, 1930. Serial No. 422,844.

This invention relates to an improved method and apparatus for carburetting fuel to be used in internal combustion engines.

It has been found that in the operation of such engines that, so far as the carburetting of the fuel is concerned, maximum efficiency can be obtained by varying the temperature of the air entering the carburettor in proportion to the load conditions on the engine. In other words, when the engine is running idle, without any load imposed thereon, the temperature of the air entering the carburetor should be relatively high, and inversely, when there is a heavy load on the engine, the temperature of the air should be correspondingly low. Furthermore, it has been found desirable, especially in the burning of kerosene, and to a lesser extent in the burning of gasoline, to conduct to the air and gaseous admixture, a suitable supply of a fluid, such as water or alcohol, for increasing the practical efficiency of the explosive mixture by decreasing or overcoming detonation. Minimizing detonation permits higher compression pressures to be established in the cylinders and consequently results in increased power.

It is an object of the present invention to supply to an internal combustion engine a fluid for decreasing detonation, and to control, by variations in pressure occurring in the intake manifold, above the throttle valve the amount of fluid supplied.

In another aspect an object of the invention resides in the method of carburetting fuel which comprises admitting hot or cold air to the fuel in accordance with load conditions on the engine, and in adding to the partially carburetted mixture a fluid for decreasing detonation. The amount of fluid so added is likewise in proportion to variations occurring in the load on the engine, and the changes in the load are measured by pressure variations occurring in the intake manifold above the throttle valve.

A further object of the invention resides in the provision of an improved apparatus for use in carburetting fuel in internal combustion engines. A feature which is conducive to the accomplishment of the recited object consists in the utilization of a movable member, the movement of which is controlled by variations in pressure within the intake manifold, and a plurality of valve devices actuated by the movable member for controlling respectively the amount of fluid and the temperature of the air admitted during the carburetting action.

Other objects and features of the invention will become apparent from a reading of the following specification in the light of the accompanying drawing in which—

Figure 1 is a view in side elevation of an internal combustion engine equipped in accordance with the present invention.

Figure 2 is a view in section of a certain portion of the apparatus disclosed in Figure 1, and Figure 3 is an enlarged fragmentary view of a check valve with which is provided the mechanism shown in Figure 2.

As illustrated in the drawing, an ordinary internal combustion engine 10 is provided with the customary intake manifold composed of the horizontally extending passageway 12 and the vertically extending passageway 14, the latter being equipped with the usual throttle valve 16. The purpose of the intake manifold is to conduct an explosive mixture to the cylinders and, as disclosed herein, the mixture is formed by adding a suitable amount of air to a supply of fuel entering the intake manifold through a carburetor 18. The fuel so entering may be gasoline, kerosene, natural gas, etc., it being understood that the present invention is not to be limited in any wise by the particular type of fuel being burned. As hereinbefore pointed out the present invention is adapted to supply either hot or cold air or a mixture of both to the intake manifold and to this end the illustrated engine is equipped with an air cleaner 20 connecting with a pre-heater or stove 22, and thence connecting, by means of the closed conduit 24, with a valve controlled air inlet 26.

In operation air passes through the cleaner 20 and is heated by the stove 22 and then flows through the conduit 24 on its way to the intake manifold. In order to supply the intake manifold with cold air an additional air cleaner 28 is provided and this latter cleaner serves for the admission of such air to the valve controlled inlet 26.

As illustrated in Fig. 2 warm air flowing through the conduit 24 is adapted to enter the inlet 26 through an opening 30 and similarly, cold air entering through the cleaner 28 is adapted to flow into the inlet 26 through an opening 32. In order to govern and to regulate the amount of hot or cold air entering through the openings 30 and 32 the inlet passageway has mounted therein a double acting valve 34 equipped with oppositely facing seats 36 and 38. The seat 36 is adapted to move into a position to close the opening 30 and the seat 38 may likewise move into a position to close the opening 32, or intermediately between these two extreme positions the valve serves to control the admission to the inlet 26 of a mixture of warm and cold air.

The apparatus is provided with means for controlling the movement of the valve 34 to govern the admission of hot or cold air to the inlet 26, and as illustrated herein, such means comprises a corrugated flexible diaphragm 40 having mounted therein a compression spring 42. The diaphragm abuts at one of its ends in annular plate 44, which, by means of a stud bolt 46, retains in place a screen retaining disk 48. The plate 44 is maintained in proper position by means of spacing sleeves 50 and enclosed bolts 52 which are provided at suitably spaced points about marginal edge of the plate member 44.

It will be appreciated from the description of the parts, which has just been given, that the cleaning screen 28 may be readily and easily removed from the assemblage merely by first removing the stud bolt 46, and next the retaining disk 48, whereupon the screen is free and may be taken out for cleaning purposes. The extremity of the expansible and contractible diaphragm 40 disposed oppositely to the extremity engaged by the annular member 44 bears against a closure member 54 which has a valve stem 56 extending therefrom. Lock nuts 58 mounted upon the valve stem engage the valve 36 and cause the valve member to be held rigidly against movement between the lock nuts and the closure member 54. The diaphragm is arranged to be contracted or expanded by means of variations in pressure occurring within it: for example, if a vacuum is applied to the interior of the diaphragm it will cause the latter to contract against the tendency of the spring to expand it and will result in the valve 38 moving into a position to close the opening 32. On the other hand in the absence of a moderately strong vacuum the spring 42, being under a compressed condition tends to expand the diaphragm and cause the valve seat 36 to move into a position closing the opening 30.

The variations in pressure that are needed for causing operation of the flexible diaphragm are obtained from the intake manifold, at a point above the throttle valve. As illustrated a passageway or conduit 60 has communication through an opening 62 with the interior of the diaphragm and leads, as shown in Fig. 1 from the latter to the intake manifold 12.

Thus, when variations in pressure occur within the intake manifold the diaphragm will be caused to contract or expand, as will be hereinafter more fully explained, and hot or cold air will be accordingly admitted.

It has been found that in the use of the apparatus disclosed, it is desirable to have the diaphragm expand slowly in cutting off the supply of hot air, and to contract or collapse rapidly to shut off the supply of cold air. Accordingly as illustrated herein, there is provided a check valve 64 at the point of junction of the conduit 60 with the opening 62. The valve 64 is provided with a transversely extending pin 65, for a purpose later to be explained. Located between the pin 65 and the opening 62 is a ball member 66 which comprises a valve and is adapted to rest upon a seat 68 in which position it closes an inlet 70 leading between the conduit 60 and the opening 62. A by-pass 72 is provided for a purpose which will now be described. In operation the ball valve 66 is held in a trapped position between the inlet 70 and the pin 65, and when pressure, or a decrease in the vacuum, is transmitted through the conduit 60 to the interior of the diaphragm to permit expansion of the latter, the ball valve 66 will move into a seated position with respect to the inlet 70, thereby causing the change in pressure which would normally be exerted through the inlet 70, to be transmitted through the small by-pass 72, with the result that it is slow in exerting its effect upon the diaphragm, thereby insuring that the supply of hot air will always be cut down gradually. On the other hand, when the pressure in the conduit 60 decreases to cause the diaphragm to collapse, the ball valve moves into a sustained position, limited by the pin 65, shown in Fig. 3, and the air is free to rush out through, not only the by-pass 72, but also the larger inlet 70.

When the throttle valve 16 occupies a closed position as shown in Fig. 1, a comparatively high vacuum is maintained within the intake manifold 12 thereby holding the diaphragm 40 in a collapsed position with the cold air inlet opening 32 closed by the valve 34, and warm air entering from the heater or stove 22. As the load or speed of the engine is increased by opening the throttle valve and allowing more fuel to pass to the cylinders, the vacuum within the intake manifold is, of course, decreased, with the result that the spring 42 tends to expand the diaphragm and causes the valve seat 38 to move away from the opening 32, permitting cold air to enter and mix with the warm air in proportion to the variations in the load conditions. If the throttle is wide open there will be practically no vacuum in the intake manifold with the result that the spring 42 can exert its entire influence upon the diaphragm, thereby causing the valve seat 36 to move into a position to close the valve opening 30.

It has been found that it is desirable at all times to permit a certain amount of warm air to pass to the intake manifold under all conditions and hence as illustrated herein the valve 36 is provided with openings 74 of a predetermined size, to permit the entry of a predetermined amount of warm air, even when the warm air inlet 30 is closed by the valve. Thus it will be seen that the amount of hot or cold air admitted by the apparatus is in direct proportion and dependent upon the degree of vacuum maintained in the intake manifold above the throttle valve.

It has heretofore been pointed out that the apparatus is equipped with means for supplying to the engine a fluid for decreasing detonation and it is to a description of this feature of the engine that the following paragraphs will be devoted. As shown in Fig. 1, there is provided an engine driven fluid pump 80 for drawing fluid from a suitable source of supply, such as the engine cooling system, and delivering it at a constant pressure to a control valve chamber 82. There is provided a bypass 84 having a relief valve 86, for shunting water or other suitable anti-knock fluid around the pump if desired. The control valve within the chamber 82 is adapted to be operated in such a manner as to admit fluid in accordance with variations occurring in the load imposed upon the engine, which is to say, the admission of fluid is controlled in a manner somewhat analogous to the admission of hot and cold air to the intake manifold.

As shown in Fig. 2 there is provided a fluid conducting passageway 88 leading from the pump 80 to the relief or control valve chamber 82. Furthermore, leading from the valve chamber 82 are a plurality of oppositely extending passageways 90, 92 for conducting the incoming fluid from the valve chamber to the intake manifold and for injecting the fluid into the latter at points located near the point of junction of the intake manifold with the cylinders. The purpose in injecting the fluid at such points will be hereinafter more fully explained.

The admission of fluid from the passageway 88 to the branch passageways 90 and 92 is controlled by means of a tapered control valve 94 adapted to be seated upon a sloping annular shoulder 96 and to be raised from the shoulder by the valve stem 56 extending from the diaphragm 40. A compression spring 98 serves to restore the valve to a seated position whenever such action is permitted by the valve stem 56. Located within the lower part of the valve chamber 82 is a suitable packing 100 for preventing the escape of fluid around the stem.

In the operation of the apparatus the fluid control valve 94 is raised more, or less, or not at all, according to the contraction and expansion of the diaphragm 40. If the load on the engine is a heavy one and the throttle valve is well open the diaphragm expands causing the fluid control valve 94 to be opened to a correspondingly full extent, thereby permitting a comparatively large flow of fluid through the passageways 90 and 92. Reversely if the load is small and the throttle valve is closed a high vacuum builds up, contracting the diaphragm and thus serving to close or nearly close the fluid control valve 94.

When the engine is turned off there will be no vacuum present; the spring 42 will expand the diaphragm, and the valve 94 will be open. In this condition, unless care is taken to prevent such an occurrence, fluid, if fed by gravity, would flood the manifold and the cylinders. Accordingly the feature of feeding the fluid by an engine control pump is important for when the engine stops, the pump stops and no more fluid is fed to the valve chamber 82.

Fluid injection, generally the fluid concerned is water or alcohol, is beneficial in overcoming detonation thus permitting higher compression pressures and hence more power. Ordinarily the fluid is admitted at the carburetor, but a feature of the present invention consists in admitting it through carburetted jets 102, 104, into the manifold as near as possible to the ports leading into the cylinders. The important purpose of so locating the jets is to avoid the loss of volumetric efficiency caused by the expansion of the water into vapor when passing through the manifold. Small bore jets of considerable length are used to inject the water into the manifold as near the cylinders as possible and these jets serve to assist in getting the proper metering of fluid and also to spray the latter into the center of the air stream. From the description that has been given the steps and combination of steps of the method of carburetting the fuel must be clear, and accordingly no further time or space will be taken up by a specific and detailed description thereof. It will be appreciated that changes and modifications in the design and arrangement of the apparatus may be made from time to time without departing from the scope of the invention as set forth in the appended claims.

Having thus described the invention, what we claim is new and desire to secure by Letters Patent of the United States, is:

1. That improvement in methods of carburetting fuel for internal combusion engines which comprises mixing fuel with cold air and a predetermined amount of hot air when the engine is carrying its heaviest load, mixing the fuel with a quantity of cold air and at proportionately greater amount of hot air when the engine is carrying relatively lighter loads, and supplying the mixture under relatively heavy loads with a quantity of fluid to decrease detonation.

2. That improvement in methods of carburetting fuel for internal combustion engines which comprises, mixing fuel with cold air and a reduced amount of hot air when the engine is carrying its heaviest load, mixing the fuel with a quantity of cold air and a proportionately greater amount of hot air when the engine is carrying relatively lighter loads, and supplying the mixture under relatively heavy loads with a quantity of fluid to decrease detonation, the amount of fluid so supplied depending on the load conditions of the engine.

3. That improvement in methods of carburetting fuel for use in internal combustion engines which comprises supplying a mixture of hot air and fuel when the engine is running without any substantial load, decreasing the temperature of the air as the load increases, and adding to the mixture a quantity of liquid to prevent detonation under heavy load.

4. In an internal combustion engine having an intake manifold a carburetor connected to said intake manifold having a source of hot air, a source of cold air, and an air valve for controlling the temperature of air admitted to said carburetor, means for supplying fluid to said intake manifold, a fluid control valve for said last named means, and means responsive to variations in load conditions of said engine for varying the position of said air valve and said fluid control valve, said last named means being active to affect the introduction of relatively hot air and a minimum amount of fluid under starting conditions of said engine, and progressively changing said condition in corresponding relationship to the progressive changes in the running of said engine.

5. In combination with an internal combustion engine having an intake manifold, a carburetor having a supply of hot air and a supply of cold air connected to said manifold, means for feeding fluid to said manifold, a pressure responsive device connected to said intake manifold, and means connected to said pressure responsive device for controlling the temperature of the air supplied to said carburetor and for varying the quantity of fluid admitted to said manifold.

6. An apparatus of the character described, comprising, in combination, an expansible and contractible diaphragm, yielding means tending normally to maintain the diaphragm in expanded condition, said diaphragm being subject to contraction by decreases in pressure occurring within the body thereof, a valve stem moved by the expansion and contraction of the diaphragm, and a plurality of valves controlled by the valve stem for governing the flow of fluid through a plurality of passageways, one of said valves being provided with an opening therein for permitting the flow of at least a predetermined amount of one of the fluids past said valve at all times.

7. An internal combustion engine having, in combination, a diaphragm, an intake manifold, means connecting the diaphragm with the intake manifold, a valve stem extending from the diaphragm and adapted to be actuated thereby, an air passageway leading to the intake manifold, hot and cold air inlets communicating with the air passageway, and a double acting valve mounted on the valve stem for governing the admission of hot and cold air through the inlets.

8. An internal combustion engine having, in combination, a diaphragm, an intake manifold, means connecting the diaphragm with the intake manifold, a valve extending from the diaphragm and adapted to be actuated thereby, an air passageway leading to the intake manifold, hot and cold air inlets communicating with the air passageway, a double acting valve mounted on the valve stem for governing the admission of hot and cold air through the inlets, a fluid conduit, and a second valve operated by the valve stem for controlling the flow of fluid through said conduit.

9. An internal combustion engine having, in combination, a diaphragm, an intake manifold, means connecting the diaphragm with the intake manifold, a valve stem extending from the diaphragm and adapted to be actuated thereby, an air passageway leading to the intake manifold, hot and cold air inlets communicating with the air passageway, and a double acting valve mounted on the valve stem for governing the admission of hot and cold air through the inlets, said double acting valve being provided with an opening therein for permitting the flow of at least a predetermined amount of hot air past said valve at all times.

10. An internal combustion engine having, in combination, an intake manifold, an air preheater, an air cleaner for allowing the admission of air to the preheater, a cold air inlet, a passageway leading to the intake manifold and serving to communicate with the preheater and the cold air inlet, means controlled by variations in the load conditions of the engine for governing the amount of air admitted from the preheater and the cold air inlet to the passageway, a fluid supply line, means also controlled by variations in the load conditions of the engine for limiting the amount of fluid admitted through the supply line, and a conduit delivering the admitted fluid to the intake manifold near the points of junction of the manifold with the engine.

Signed at Clinton, Iowa, this 23rd day of December, 1929.

HARRY H. WATERS.
RUDOLPH F. GAGG.

CERTIFICATE OF CORRECTION.

Patent No. 1,901,618.

March 14, 1933.

HARRY H. WATERS, ET AL.

It is hereby certified that error appears in the printed specification of the above numbered patent requiring correction as follows: Page 4, line 11, claim 1, for "combusion" read "combustion", and line 16, for "at" read "a"; and line 105, claim 8, after "valve" insert the word "stem"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)

10. An internal combustion engine having, in combination, an intake manifold, an air preheater, an air cleaner for allowing the admission of air to the preheater, a cold air inlet, a passageway leading to the intake manifold and serving to communicate with the preheater and the cold air inlet, means controlled by variations in the load conditions of the engine for governing the amount of air admitted from the preheater and the cold air inlet to the passageway, a fluid supply line, means also controlled by variations in the load conditions of the engine for limiting the amount of fluid admitted through the supply line, and a conduit delivering the admitted fluid to the intake manifold near the points of junction of the manifold with the engine.

Signed at Clinton, Iowa, this 23rd day of December, 1929.

HARRY H. WATERS.
RUDOLPH F. GAGG.

CERTIFICATE OF CORRECTION.

Patent No. 1,901,618.

March 14, 1933.

HARRY H. WATERS, ET AL.

It is hereby certified that error appears in the printed specification of the above numbered patent requiring correction as follows: Page 4, line 11, claim 1, for "combusion" read "combustion", and line 16, for "at" read "a"; and line 105, claim 8, after "valve" insert the word "stem"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)

CERTIFICATE OF CORRECTION.

Patent No. 1,901,618.                                        March 14, 1933.

HARRY H. WATERS, ET AL.

It is hereby certified that error appears in the printed specification of the above numbered patent requiring correction as follows: Page 4, line 11, claim 1, for "combusion" read "combustion", and line 16, for "at" read "a"; and line 105, claim 8, after "valve" insert the word "stem"; and that the said Letters Patent should be read with these corrections therein that the same may conform to the record of the case in the Patent Office.

Signed and sealed this 16th day of May, A. D. 1933.

M. J. Moore.

(Seal)                                          Acting Commissioner of Patents.